United States Patent [19]
Sato

[11] Patent Number: 5,231,394
[45] Date of Patent: Jul. 27, 1993

[54] SIGNAL REPRODUCING METHOD

[75] Inventor: Hideaki Sato, Yokohama, Japan

[73] Assignee: Canon Kabushiki Kaisha, Tokyo, Japan

[21] Appl. No.: 382,225

[22] Filed: Jul. 20, 1989

[30] Foreign Application Priority Data

Jul. 25, 1988 [JP] Japan .................. 63-183465

[51] Int. Cl.$^5$ .................. H03M 7/00; G11B 5/00
[52] U.S. Cl. .................. 341/50; 341/94; 341/122; 360/32
[58] Field of Search .......... 341/122, 110, 155, 53, 341/118, 126, 94, 200, 50; 360/32; 375/120

[56] References Cited

U.S. PATENT DOCUMENTS

| | | | |
|---|---|---|---|
| 3,995,264 | 11/1976 | Ouchi | 341/94 X |
| 4,206,476 | 6/1980 | Hashimoto | 360/32 X |
| 4,216,460 | 8/1980 | Baldwin et al. | 341/94 |
| 4,772,959 | 9/1988 | Amano et al. | 360/32 |
| 4,972,190 | 11/1990 | Primeau et al. | 360/32 |

Primary Examiner—Sharon D. Logan
Attorney, Agent, or Firm—Fitzpatrick, Cella, Harper & Scinto

[57] ABSTRACT

A signal reproducing method comprising the steps of: inputting a reproduction signal of a signal which was encoded by a predetermined coding system; converting states of a plurality of portions of the waveform of the reproduction signal into numerical values in order to reproduce the input reproduction signal as the signal of a code train of "1" or "0"; and sequentially determining the portions as many as only the number specified by the coding system among the plurality of portions which were converted into the numerical values to be "1" on the basis of the magnitudes of the numerical values. By this arrangement, a signal reproducing method which can be reduced code errors of the reproduced signal may be provided.

16 Claims, 5 Drawing Sheets

FIG. 1

(a) RECORDED CODE TRAIN    1 0 1 1 0 0 1 0

(b) ANALOG WAVE FORM OF REPRODUCED SIGNAL (c) TRAIN OF SAMPLING VALUE (d) CODE TRAIN DETERMINED ON THE BASIS OF CODE WEIGHT    1 0 1 1 0 0 1 0

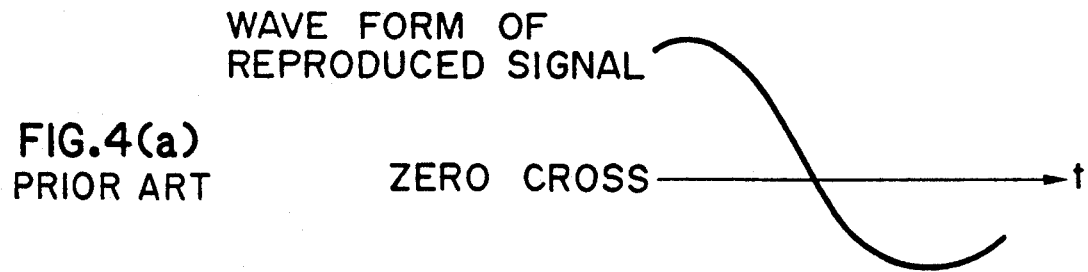
FIG.4(a) PRIOR ART — WAVE FORM OF REPRODUCED SIGNAL / ZERO CROSS
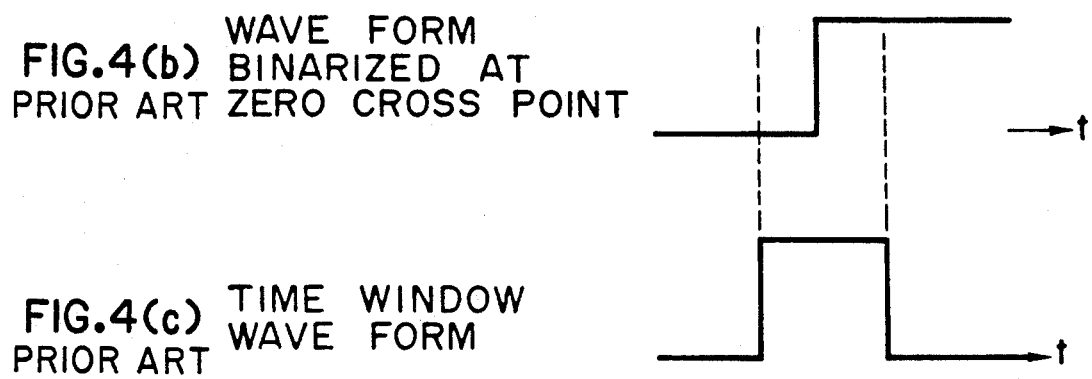
FIG.4(b) PRIOR ART — WAVE FORM BINARIZED AT ZERO CROSS POINT
FIG.4(c) PRIOR ART — TIME WINDOW WAVE FORM
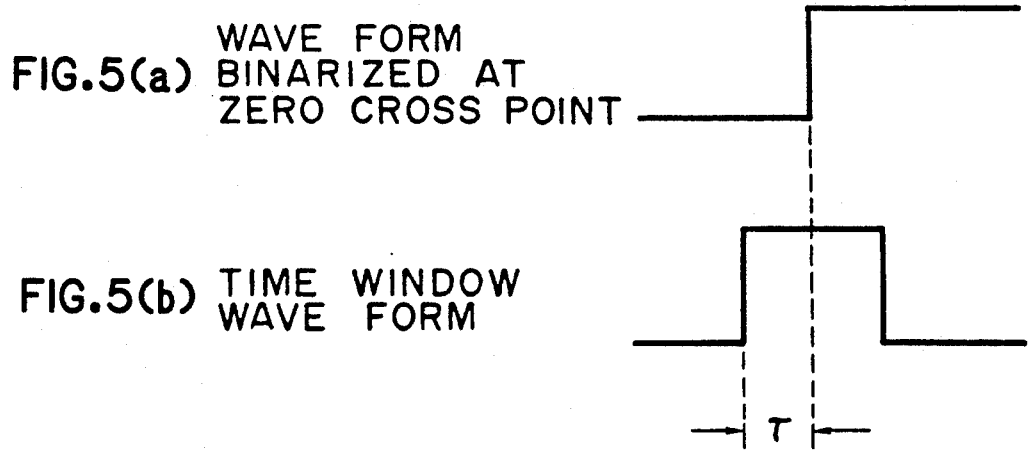
FIG.5(a) — WAVE FORM BINARIZED AT ZERO CROSS POINT
FIG.5(b) — TIME WINDOW WAVE FORM

FIG.7
ZD CODE | 1 | 0 | 0 | 1 | 1 | 0 | 1 | 0 |
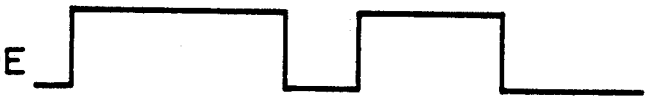
MRZ CODE
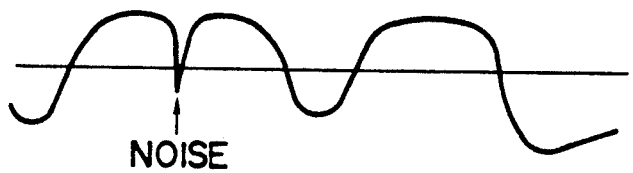
WAVE FORM OF REPRODUCED SIGNAL
↑ NOISE
BINARY SIGNAL
TIME WINDOW WAVE FORM
REPRODUCED CODE TRAIN   1 0 0 1 1 0 1 0

SIGNAL REPRODUCING METHOD

BACKGROUND OF THE INVENTION

1. Field of the Invention

The present invention relates to a method of reproducing encoded information.

2. Related Background Art

Hitherto, as a code utilized for recording information to a recording medium, there is a coding system in which a limitation (for example, the number of code "1"s is limited) is added to a weight of code, as shown in Zero Disparity code (ZD code) or Low Disparity code (LD code). The above codes are described in detail in e.g., "Tendency of Encoding System in High Density Recording" written by Saburo Tazaki and Hisashi Osawa, Vol 12, 1985. In such a coding system, the error may be reduced by utilizing the above limitation as information.

In a case where such a signal is magnetically or optically recorded on a recording medium with a RZ code and where a recorded digital signal is reproduced, generally, an attention is paid to the state of the analog waveform of the reproduction signal and a discrimination regarding 1 and 0 is executed.

For instance, an attention is paid to the level of the analog waveform of the reproduction signal, the reproduction signal is binarized by a comparator (a fixed binarization discrimination level), the binarized value is regarded as a code, and thereafter, the code is decoded.

However, as shown in FIG. 2, the actual reproduction signal waveform is accompanied with various fluctuations due to a local change of a recording medium, a tracking state, an interference between codes, and the like. Therefore, the code train of the reproduced signal does not always become the same code as the recorded code and a code error is caused.

On the other hand, FIG. 4 is a diagram showing conventional processes on the time base of the reproduction signal of NRZ code. In the case of FIG. 4, since the transition portion (zero cross point of the reproduction waveform) of the waveform of the signal obtained by binarizing the reproduction signal lies within a high level range of a time window signal, the result of the discrimination is "1".

However, as is well known, the transition portion has a time base fluctuation (what is called a jitter) due to the mechanical noises of the reproducing apparatus or the like and such a time base fluctuation results in a cause of the erroneous discrimination.

Such a problem occurs not only in the case where the signal is reproduced from a recording medium but also on the reception side when the signal was communicated.

SUMMARY OF THE INVENTION

It is an object of the present invention to eliminate the foregoing drawbacks and to provide an improved signal reproducing method.

Another object of the invention is to provide a signal reproducing method which can reduce code errors of the reproduced signal.

Still another object of the invention is to provide a method of reproducing a signal on the basis of an input signal waveform and a code weight of the original signal.

The above and other objects and features of the present invention will become apparent from the following detailed description and the appended claims with reference to the accompanying drawings.

BRIEF DESCRIPTION OF THE DRAWINGS

FIG. 1 is a diagram showing signal waveforms and a determination state in the first embodiment of the present invention;

FIG. 4 is a diagram showing a conventional processing state on the time base;

FIG. 5 is a diagram showing a processing state on the time base in the second embodiment of the invention;

FIG. 7 is a diagram showing a waveform of signal and determination state in the second embodiment of the present invention.

DETAILED DESCRIPTION OF THE PREFERRED EMBODIMENT

An embodiment of the present invention will be described with reference to the drawings.

FIG. 1 shows a signal processing state in the first embodiment of the invention. In FIG. 1, a signal represents a code train of "1" and "0" encoded by a ZD coding system with a RZ code.

In the diagram, (a) denotes a code train of one unit of the signal recorded on a recording medium. (b) indicates a signal waveform when the signal (a) recorded on the recording medium was reproduced. (c) represents a signal which is obtained by sampling the reproduction signal (b). (d) denotes signal indicative of the result of the determination of "1" and "0" from the sample value train of the sampled signal (c) on the basis of the weight of code of the original signal (a).

Figure 3:
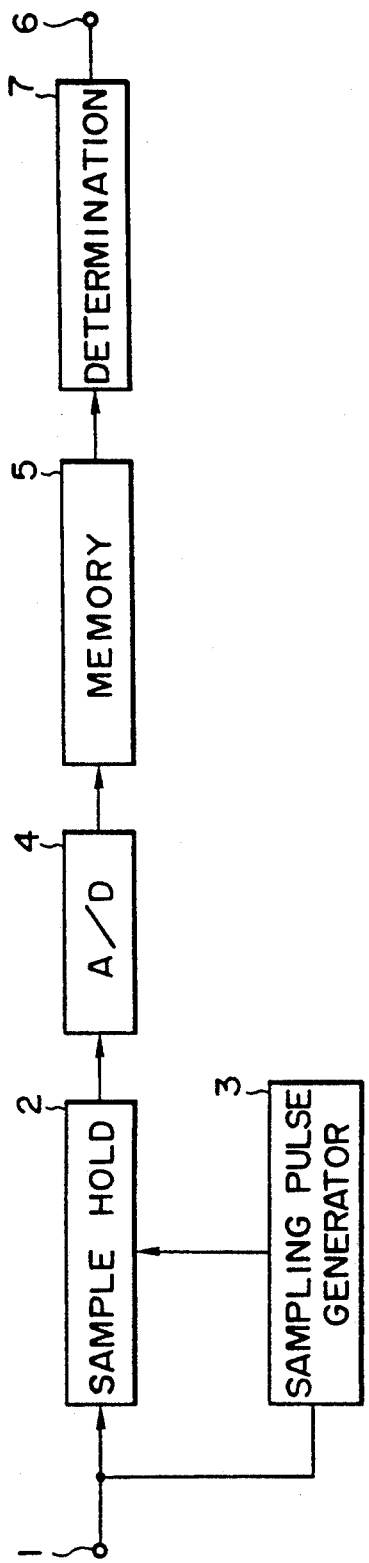
FIG. 3 is a diagram showing a construction of the first embodiment of the invention.

A practical construction of the embodiment is shown in FIG. 3.

In FIG. 3, reference numeral 1 denotes an input terminal of a reproduction signal; 2 indicates a sample and hold circuit; 3 a well-known sampling pulse generator comprising a PLL circuit or the like; 4 an A/D converter to convert the reproduction signal into the digital signal; 5 a memory to store the signal converted into the digital values; 7 a determination circuit to determine "1" and "0"; and 6 an output terminal.

The embodiment will be described with respect to the case of processing by paying an attention to the level of the analog waveform of the reproduction signal which was input.

FIG. 1 shows that the generation of errors can be reduced. In the embodiment, the peak value of the reproduction signal (analog waveform) which was input to the input terminal 1 is sampled by the sample and hold circuit 2 by using sampling pulses which are generated from the sampling pulse generator 3 without using a fixed threshold level. The sampling value train is A/D converted into the digital numerical value train by the A/D converter 4 and stored into the memory 5. In the determination circuit, the numerical values among the numerical value train stored in the memory 5 are compared with each other. A group of numerical values as many as only the limited number (e.g., four in the present embodiment) of code weights are determined to be code "1" in accordance with the sequence from the larger numerical values. A group of the other numerical values are decided to be code "0". The determined code "1" or "0" is output from the output terminal 6.

The limited number of code weights denotes the number of "1" in the encoded signal which is specified by a predetermined coding system.

Figure 2:
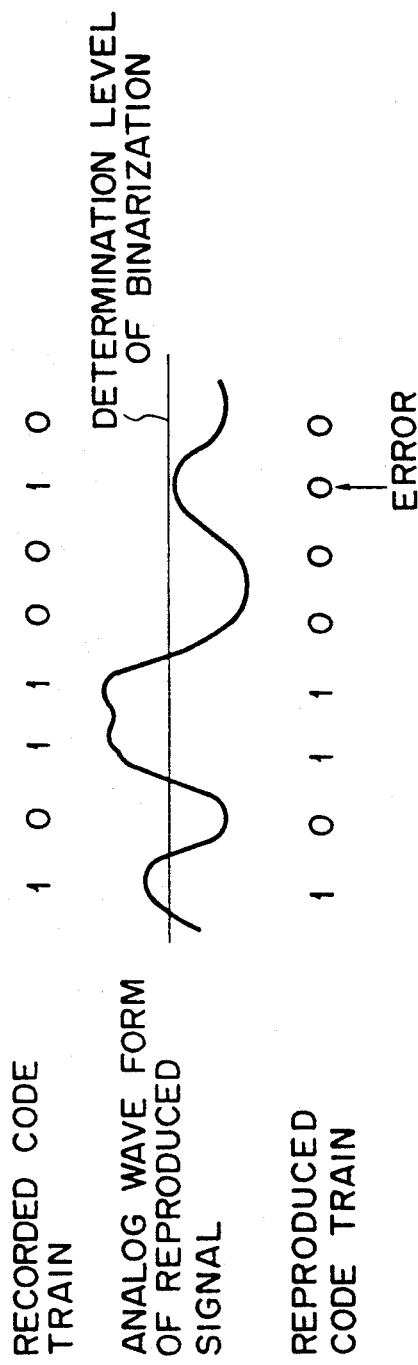
FIG. 2 is a diagram showing a conventional determination state.

In the above construction, the levels at a plurality of points of the reproduction signal (analog waveform) which was input to the input terminal 1 are digitized and the resultant digital values are determined to be "1" by only the number of minimum code weights from the maximum value of the signal levels at a plurality of respective points by the determination circuit 7. Due to this, the erroneous portion as shown in FIG. 2 in the conventional apparatus are also determined to "1" instead of "0" and the number of errors can be reduced.

The second embodiment of the invention will now be shown with respect to the case where the processes of the input signal waveform for the signal reproduction are executed on the time base. In the second embodiment, a signal represents a code train of "1" and "0" encoded by a ZD coding system with NRZ code.

Figure 6:
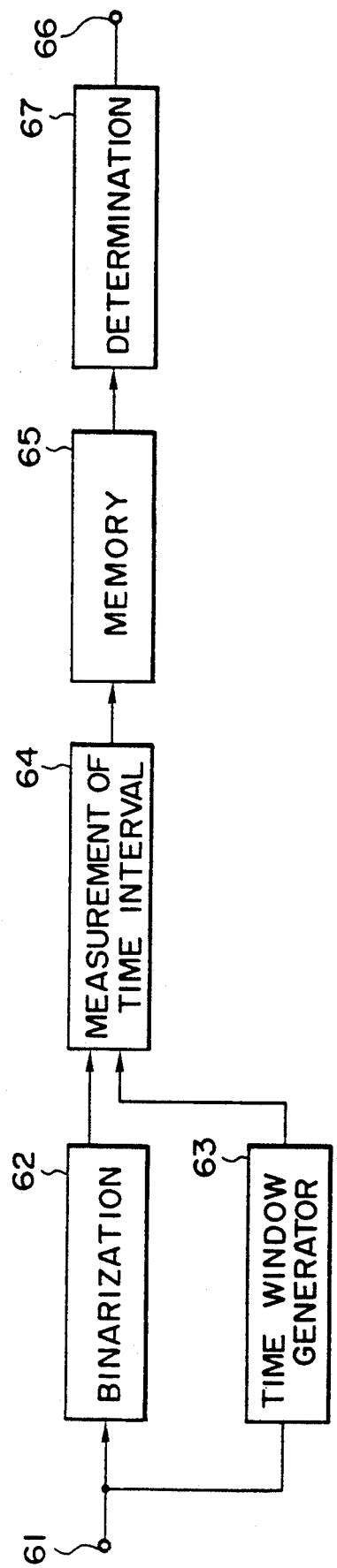
FIG. 6 is a diagram showing a construction of the second embodiment of the invention.

FIG. 6 shows a construction of the second embodiment. In FIG. 6, reference numeral 61 denotes an input terminal for inputting reproduction signal represented by NRZ code; 62 indicates a well-known binarization circuit comprising a comparator or the like for binarizing an input signal from the input terminal 61 on the basis of a predetermined threshold value or of a zero-cross portion of a signal generated by eliminating direct current component from an input signal; 63 a well-known time window signal generator comprising a PLL circuit or the like and generating a signal in synchronization with a code train of "1" and "0" of an original signal; 64 a well-known time interval measurement circuit comprising a counter, a timer, and the like; 65 a memory; 67 a determination circuit; and 66 an output terminal.

In the above construction, as shown in FIG. 5, the time interval measurement circuit 64 measures a time interval $\tau$ between the leading edge of a time window waveform (a) from the time window signal generator 63 and the transition point of a waveform (b) from the binarization circuit 62 and inputs as a numerical value into the memory 65. Since a level inversion occurs at code "1" in NRZ code, a portion of a transition of a binarized signal (a) is determined to be "1". Then, in the determination circuit 67, each of time intervals $\tau$ is compared. The transitions as many as the number (e.g., four in the present embodiment) minimum code weights are determined to be "1" by the determination circuit 67 in accordance with the sequence from the time period near to a half of time width of a time window i.e., the transition near the center of the time window in a manner similar to the first embodiment and are output. Thus, the code errors can be reduced.

FIG. 7 is a diagram showing an example for reproducing an input signal of a single unit as a code train.

The invention is not limited to the signal reproduced from the recording medium but can be also applied to the signal which was received by the radio or wire transmission system.

What is claimed is:

1. A signal reproducing method comprising the steps of:
   inputting a reproduction signal of a signal which was encoded by a predetermined coding system;
   converting states of a plurality of portions of a waveform of said reproduction signal into numerical values in order to reproduce the input reproduction signal as a signal of a code train of "1" or "0"; and
   sequentially determining portions, as many as only a number specified by said coding system among said plurality of portions converted into the numerical values, as a code "1" on the basis of magnitudes of the numerical values.

2. A method according to claim 1, wherein said inputting step, a signal of an analog waveform is input.

3. A method according to claim 2, wherein said signal of the analog waveform is signal reproduced from a recording medium.

4. A method according to claim 2, wherein said signal of the analog waveform is a received signal.

5. A method according to claim 1, further comprising the step of storing the numerical values of said plurality of portions of the signal waveform which was converted into the numerical values into a memory.

6. A method according to claim 5, wherein in said determining step, said plurality of portions are determined as a code "1" or "0" by comparing said plurality of numerical values stored in said memory with each other.

7. A method according to claim 1, wherein in said determining step, the portions as many as only said specified number, are determined as a code "1" or "0" in accordance with a sequence of larger ones of the numerical values.

8. A method according to claim 1, wherein said determining step, the portions other than the portions which are determined to be "1" are decided to be "0".

9. A signal reproducing method comprising the steps of:
   inputting a reproduction signal of a signal which was encoded by a predetermined coding system;
   converting a level of a waveform of said reproduction signal into numerical values in a plurality of portions in order to reproduce the input reproduction signal as a signal of a code train of "1" or "0"; and
   sequentially determining portions, as many as only a number specified by said coding system among said plurality of portions converted into the numerical values as a code "1" on the basis of the numerical values.

10. A method according to claim 9, wherein said inputting step, a signal of an analog waveform is input.

11. A method according to claim 9, wherein said signal of the analog waveform is a signal reproduced from a recording medium.

12. A method according to claim 9, wherein said signal of the analog waveform is a received signal.

13. A method according to claim 9, wherein said step of converting into the numerical values comprises:
   sampling the levels of the waveform of the reproduction signal in the plurality of portions at predetermined times;
   sampling levels of the reproduction signal sampled waveform levels; and
   converting the samples of the levels of the reproduction signal sampled waveform levels into digital signals.

14. A method according to claim 9, further comprising the step of:

storing said plurality of levels of the waveforms of the reproduction signals which were converted into the numerical values into a memory.

15. A method according to claim 14, wherein in said determining step, said plurality of portions are determined as a code "1" or "0" by comparing said plurality of waveform levels stored in said memory with each other.

16. A method according to claim 9, wherein said determining step, the portions other than the portions which are determined to be "1" are decided to be "0".

* * * * *

UNITED STATES PATENT AND TRADEMARK OFFICE
CERTIFICATE OF CORRECTION

PATENT NO. : 5,231,394
DATED : July 27, 1993
INVENTOR(S) : HIDEAKI SATO

It is certified that error appears in the above-identified patent and that said Letters Patent is hereby corrected as shown below:

AT [57] ABSTRACT

Line 8, "portions" should read --portions,--.
    Line 10, "values" should read --values,--.
    Line 13, "be reduced" should read --reduce--.

COLUMN 1

Line 53, "was" should read --is--.

COLUMN 4

Line 11, "wherein said" should read --wherein in said--.
    Line 32, "wherein said" should read --wherein in said--.
    Line 47, "values" should read --values,--.
    Line 49, "wherein said" should read --wherein in said--.

COLUMN 6

Line 3, "wherein said" should read --wherein in said--.

Signed and Sealed this

Fourteenth Day of June, 1994

*Attest:*

BRUCE LEHMAN

*Attesting Officer*  *Commissioner of Patents and Trademarks*